Jan. 21, 1947.                W. A. EDSON                2,414,456
                        ELECTRICAL TESTING SYSTEM
                    Filed April 19, 1945        2 Sheets-Sheet 1

INVENTOR
W.A.EDSON
BY
E. V. Griggs
ATTORNEY

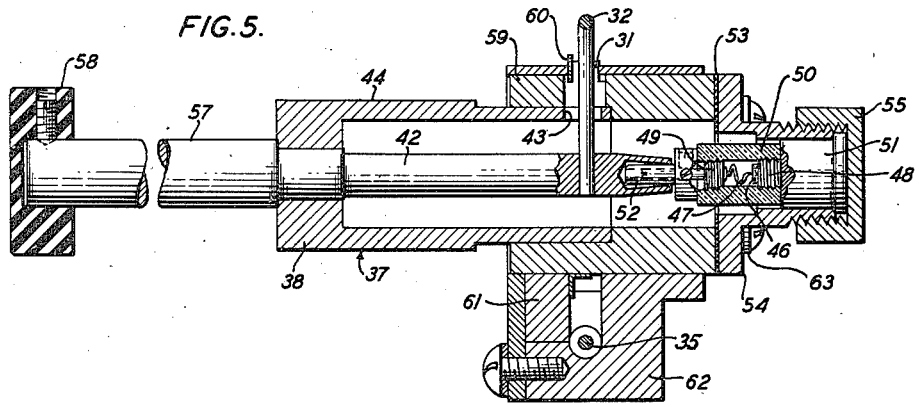
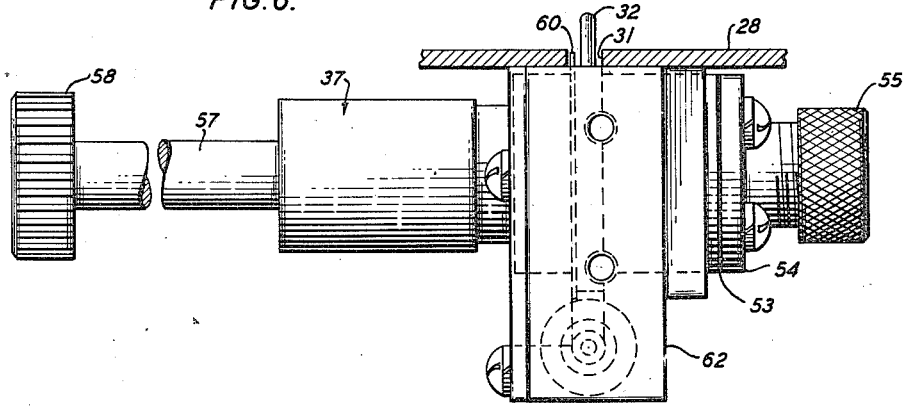
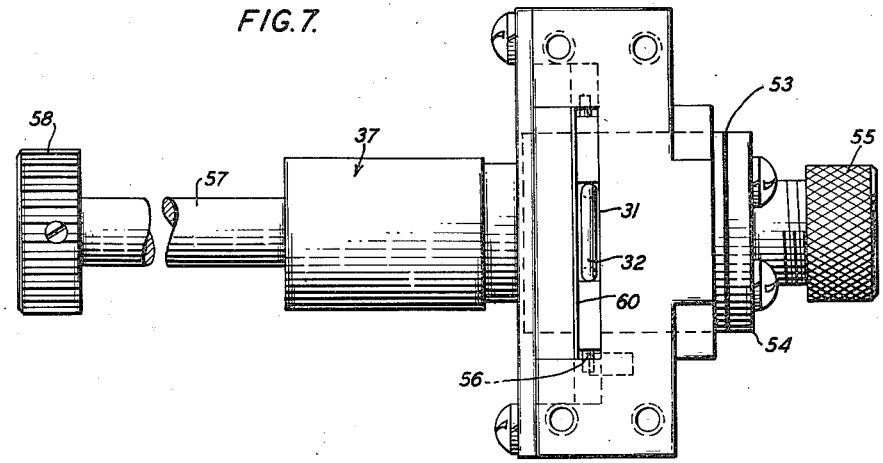

Patented Jan. 21, 1947

2,414,456

UNITED STATES PATENT OFFICE 2,414,456

ELECTRICAL TESTING SYSTEM

William A. Edson, New York, N. Y., assignor to Bell Telephone Laboratories, Incorporated, New York, N. Y., a corporation of New York Application April 19, 1945, Serial No. 589,154

7 Claims. (Cl. 250—39)

This invention relates to testing equipment and more particularly to apparatus permitting the rapid checking of the performance of object locator systems employing reflected pulses of electromagnetic waves.

An object of the invention is to provide microwave test equipment which may quickly and conveniently be changed at will from a frequency selective condition to a non-frequency selective condition.

Another object of the invention is to provide detecting apparatus for microwaves which may be invariable in its apparent electrical length while being switched from a selective or tuned input circuit to a non-tuned input circuit and vice versa.

Another object of the invention is to provide a variable coupler for microwaves which may serve to couple a detector alternately to either one of a cavity resonator or a coaxial input circuit while maintaining the detector effectively disconnected from the other.

An additional object is to provide a compact and efficient microwave switch so shielded as to prevent leak in either its open or closed positions from the circuits which it may serve to connect.

Cavity resonators have many applications in the microwave art. As phantom targets for radio object locators they respond selectively to a pulse of incoming oscillations and upon its cessation yield a protracted train of oscillations from the energy stored up in an internal electromagnetic field. In frequency measuring equipment they may serve in conjunction with a mechanical tuning device and an oscillation detecting and indicating apparatus to measure the frequency of received oscillations with a high degree of accuracy. In all these applications it is desirable to connect and disconnect them from their associated transmission circuits by apparatus which introduces a minimum of energy dissipation or reflection when in transmission or energy pass condition and which entirely removes them from the circuit when in non-transmission condition.

In microwave testing apparatus it is frequently desirable first to connect the oscillation detector and current indicator to an untuned input circuit until the presence of oscillations is established by the indicator and then to introduce in lieu of the untuned circuit a highly selective device such as a variable cavity resonator by means of which the frequency of the oscillations may be ascertained. For this purpose a simple and effective microwave switching system which will establish any of the various circuit conditions at will and, at the same time, permit the oscillation detector to operate under substantially unchanged electrical conditions is especially desirable.

In accordance with the invention an electrical microwave testing system is provided with both a non-selective or untuned input circuit and a selective or tuned circuit including a resonant cavity. The microwave oscillation detector and the detected energy indicator are built into a unitary mechanical structure with one element of a microwave switch which may be brought into effective energy transfer relation with either the untuned input circuit path or with the tuned input path at will.

In one embodiment, the unitary structure may rotate to bring a movable coupling member of the switch alternately into energy transfer relation with a stationary coupling member of an untuned input path or with the electromagnetic field of a cavity resonator.

In the drawings:

Fig. 5 is a section of the switching unit of Fig. 4 along the vertical plane 5—5 looking in the direction of the arrows;

Fig. 6 is a side view of the coupler unit of Fig. 4 as it appears from the plane 6—6 viewed in the direction of the arrows, and Fig. 7 is a top plan view of the structure of Fig. 6 detached from the cavity resonator to show its upper surface.

Figure 1:
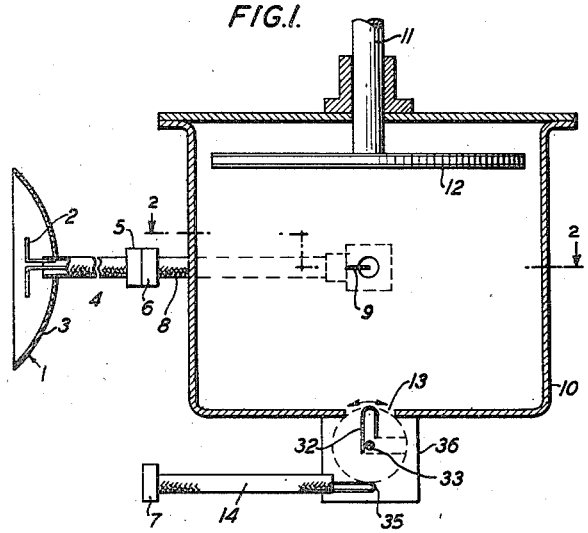
Fig. 1 illustrates diagrammatically a testing equipment which constitutes one embodiment of the invention.
Figure 2:
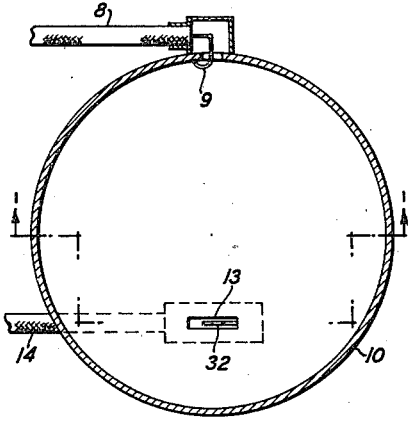
Fig. 2 is a section along the plane 2—2 of the structure shown in Fig. 1.

Referring to Fig. 1, a microwave pickup device 1 which may comprise a dipole 2 associated with a collecting reflector 3 is connected to a coaxial section 4 having a terminal plug 5 which may be inserted either in the jack 6 of a tuned input system or in the jack 7 of an untuned circuit. The tuned input circuit involves a coaxial section 8 coupled by a loop 9 to the internal electromagnetic field of the cavity resonator 10. The tuning of the resonator 10 may be varied at will by a reciprocation of the tuning plunger 11 and the tuning piston 12 to a position at which the resonator responds most strongly to the desired frequency. An aperture 13 in the bottom of the resonator 10 enables coupling of the resonator to a detector and indicator circuit, not shown, when the coupling loop 32 mounted on a rotatable structure having a central horizontal axis of rotation 33 is in the position shown in Fig. 1. In that position the loop 31 projects slightly into the internal electromagnetic field of the resonator 10. The untuned input circuit comprising the jack 7, and the coaxial section 14 terminates in a stationary coupling loop 35 which, together with the rotatable loop 32, is located within the shielded casing 36 of the coupling and switching structure. In the condition shown in Fig. 1 the loop 32 is in such position as to be substantially wholly uncoupled from the loop 35 and to have its maximum coupling with the internal electromagnetic field of resonator 10.

Figure 3:
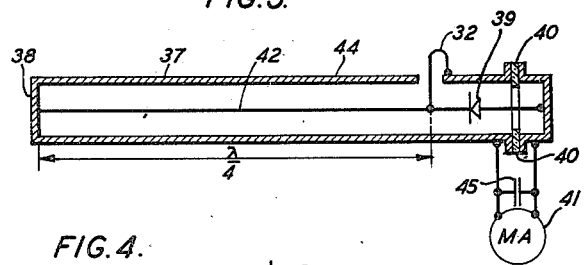
Fig. 3 is a circuit schematic of the detector indicator apparatus to be used with the testing system of Fig. 1.

Fig. 3 is a schematic of the circuit of the movable coupling loop 32. As illustrated, the loop 32 is connected across the otherwise open end of a coaxial device 37 of approximately a quarter wavelength, short-circuited at its remote end at 38. Accordingly, the device 37 presents at its open end to the loop 32 an extremely high impedance for oscillations of frequencies at which it approximates a quarter wavelength. Connected in series between the terminals of the loop 32 is a detector 39 which is in circuit with annular bypass capacitance 40 having a capacitance of the order of 10 micro-microfarads for blocking unidirectional currents resulting from the detection operation. This unidirectional current may traverse the path afforded by the milliammeter 41 which indicates the unidirectional current intensity. The quarter wavelength section permits effective potentials of the desired oscillations to be built up across the terminals of loop 32 and applied to the detector 39. This structure therefore provides a convenient and sensitive means for insuring an indication which is accurately indicative of the intensity of the field to which the loop 32 is coupled. The relatively large integrating condenser 45 having a capacitance of the order of a microfarad serves to smooth the current to the meter in case the final frequency energy is supplied in the form of intermittent pulses.

By modifying the length of the coaxial structure from one-quarter wavelength it is possible to obtain the effect of either an inductive or a capacitative reactance in shunt with the loop 32. This is desirable because the input impedance of the detector 39 is not a pure resistance and it is possible to compensate in this manner for its reactive component so as to obtain the full resonance electromotive force for application to the detector. By this means it is possible to improve the sensitivity of the device or to increase the constancy of the sensitivity with respect to frequency.

Figure 4:
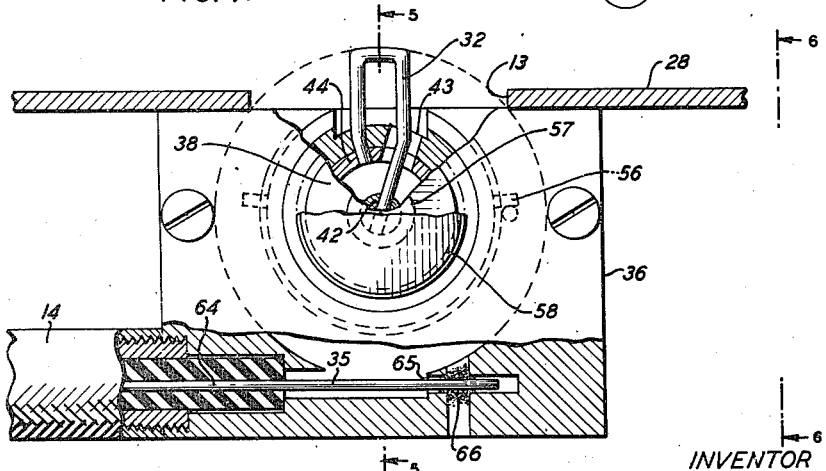
Fig. 4 is an end view of the coupler and switching unit with portions broken away to disclose the internal structure.

Fig. 4 is an end view of that portion of the apparatus of Fig. 1 including and immediately associated with the casing 36. The rotatable portion comprises a central conductor 42 and a coaxial outer conductor 44 with the loop 32 fixedly attached at its terminals to conductors 42 and 44. The long leg of the loop passes through an aperture 43 in the outer coaxial member and the central part of the loop projects radially outward beyond the conductor 44 to enable it to extend through the aperture 13. The aperture 13 is given a dimension in the plane of the movable coupling loop 32 just sufficient to enable the loop to clear its margins. In order to disconnect the loop 32 from the electromagnetic field within the resonator 10 it is necessary only to operate the knob 58 (see Fig. 5) associated with the rotating structure supporting the loop 32 to cause the rotating structure to carry the loop 32 angularly about axis 33 to a position in which it is wholly withdrawn from the resonator field. It is quite possible with a device of this sort to obtain attenuations as high as 60 decibels in the transmission from the resonator to the loop 32 and therefore effectively to disconnect the loop 32 and its associated detector circuit from the electromagnetic field. Moreover, it will be apparent that any desired intermediate coupling or attenuation may be readily obtained by movement of the loop 32 to the appropriate intermediate angular position.

When it is desired to operate the device in the untuned input circuit the plug 5 is inserted in the jack 7, as previously described, and the loop 32 is rotated counter-clockwise to a position diametrically opposite that at which it is shown in Figs. 1 and 4. In this position the tip of the loop lies parallel to and adjacent the loop portion 35 of the central conductor 64 of the coaxial line 34 as will be apparent from Fig. 4. The end of conductor 64 passes into an opening 65 in the casing member and is preferably soldered thereto as at 66. In this manner loop 32 is effectively connected to the loop 35. The maximum coupling is effected when the pin 56 which is integrally attached to the rotatable portion of the switch has been rotated until it comes into engagement with a stop. Any intermediate degree of coupling may be obtained by rotating the shaft 42 to an appropriate intermediate position.

Fig. 5 illustrates in section the internal construction of the coupler and switch enclosed within the casing 36. The detector 39 is enclosed in a cartridge and assembled as a part of the unitary coupling and switch structure. The detector comprises a plate 46 of rectifying material such as silicon having contact engagement with the tip of a fine wire 47. The rectifying crystal 46 may be supported by a screw-threaded plug 48 and the contact wire 47 may be soldered or otherwise attached to another screw-threaded plug 49, the two plugs fitting into the internally screw-threaded vitreous cylinder 50. The detector is provided with a metallic base member 51 and a metallic terminal plug 52 which is adapted to fit within the jack integrally formed in the outer end of the central coaxial conductor 42. An annular washer 53 of mica or other dielectric material is interposed between the end of the approximately quarter wavelength coaxial structure 37 and an annular nipple 54 which is mechanically connected to the rotatable quarter wavelength section 37 by screws 63 or other fasteners but is electrically insulated therefrom. Engaging the outer screw-threaded end of the nipple 54 is a cap 55 which is adapted to bear against the metallic base member 51 of the detector cartridge. It will be apparent that the detector 39 is electrically shielded by the enclosing structure from extraneous disturbances and is connected electrically in a path leading from the tip of the central coaxial member 42 through the detector, the cap 55 and nipple 54 back to the outer coaxial conductor 44. This path is divided, as is indicated in Fig. 3, microwave oscillations passing through the capacitance 40 formed by the dielectric washer 53 and the unidirectional detected current passing through the leads to the milliammeter 41. The capacitor 45 serves, as has been explained, to smooth out the pulsations occasioned by intermittencies in the incoming oscillations.

If desired suitable stop pins and stops 56 may be provided to limit the motion of the rotating structure so that the position of maximum coupling to the internal field of the resonator 28 may readily be found. As indicated in Figs. 6 and 7 the width of the aperture 13 should be restricted to a magnitude which will nicely accommodate the loop 32 without offering a path for substantial leakage to external space. For oscillations of $TE_{01n}$ mode, for which this apparatus was specially designed, the long dimension of the aperture 13 should be circumferential so as to lie tangential to the circular electric vectors of $TE_{01n}$ mode oscillations. It will be understood, of course, that for oscillations of other desired modes, the coupling aperture will be positioned so as to enable the loop 32 to couple most effectively with the desired mode. The integral coaxial structure, together with the detector 39, is rotatably mounted in the casing 36 as has been described. The inner coaxial conductor 42 is structurally extended as an integral shaft 57 to which the knob 58 may be attached. The rotating structure passes through the casing 36 and is provided with a rigidly attached collar 59 providing an enlarged portion which is retained in position by a flat annular ring 60 attached to the collar 59 and held in rotatable alignment between the end members 61 and 62 of the casing 36.

An especially important feature of the coupling and switch structure is its mechanical and electrical simplicity. It will be apparent that the coupling switch provides a very simple and effective mechanical and electrical device for connecting the detector circuit at will and to any desired extent to either the tuned or selective input path including cavity resonator 10 or the non-selective input path by way of coaxial section 14. Moreover, when the switch is coupled to either circuit it effectively cuts off transmission from the other circuit and there is no interference from that other circuit. It follows that by first inserting the plug 5 into the jack 7, the presence of microwave oscillations and their intensity may be determined quickly. By shifting the plug 5 back to the jack 6 and rotating the coupling loop 32 to couple with the resonator 10, the apparatus is set up for measuring frequency. It remains merely to tune the resonator 10 by adjusting the position of the tuning piston 12 until a maximum response is obtained in the indicator 41.

A particularly important aspect of the invention is that it renders it possible to switch the connections of the detector circuit from one input coupling to another without in any way disturbing the highly efficient circuit connection between the detector and the coupling to the detector.

What is claimed is:

1. A microwave switch comprising a hollow casing of electrically conductive material, a fixed coupling loop mounted therewithin having terminals to enable connection of the fixed loop to one circuit, a movable coupling loop mounted in the casing and having terminals to enable connection of the movable loop to a second circuit and means external to the casing to enable an operator at will to move the movable loop into a position adjacent the fixed loop and with its plane parallel to that of the fixed loop for coupling the two circuits or into a position in which the two circuits are uncoupled.

2. A microwave switch comprising a supporting structure, a fixed coupling loop and a movable coupling loop mounted thereon, a detector also mounted on said structure and mechanically and electrically connected in invariable relation to the movable coupling loop and means for moving the movable loop at will into energy coupling relation with the fixed loop or out of energy coupling relation with respect thereto.

3. A detecting system comprising a non-selective input path, an alternative selective input path including a cavity resonator, a detector, an output path including an indicator connected to the detector and means for connecting the detector at will either to the non-selective input path or the selective input path comprising a switching structure having a fixed coupling loop connected to the non-selective path, a coupling aperture opening into a cavity resonator, a rotatable coupling loop connected to the detector and means for rotating the rotatable loop at will either to a position adjacent the fixed loop to couple the detector to the non-selective path or to a position at which it projects through the aperture into the electromagnetic field of the cavity resonator to couple the detector to the selective input path.

4. A microwave switching system comprising a closed housing of electrically conductive material, a rotary member projecting into the housing and carrying a coaxial section short-circuited at one end and of approximately a quarter wavelength at the operating frequency of the energy to be transmitted by the switch, a laterally projecting loop carried by the rotary member and connected between the terminals of the quarter wavelength section at its open end, a fixed coupling loop within the housing adjacent one position of the loop projecting from the rotary member for mutual transfer of energy at one point in the course of the member, a wave guide section having an aperture adjacent the trajectory of the projecting loop at another point whereby the quarter wavelength section may be selectively connected at will either to the fixed loop or to the electromagnetic field of the wave guide section or may be uncoupled from both.

5. A testing system comprising a microwave detecting and indicating apparatus, two input circuits therefor, one of said circuits being non-selective and being capable of setting up an electromagnetic field within a region adjacent a portion of the circuit, the other of said input circuits including a cavity resonator, a coupling device connected permanently to the detector by an electrically invariable circuit, said coupling device being mounted for movement at will either into the field of said cavity resonator or into the electromagnetic field set up in the region of the non-selective input circuit.

6. A cavity resonator comprising a substantially closed shell of electrically conducting material, said shell having a small slot aperture, a coaxial conductor section having an outer conductor, an inner conductor and a microwave detector connected in series with the inner conductor, the ends of the section being electrically closed to shield the detector, a coupler loop connnected between the two conductors and projecting through an aperture in the outer conductor, means for mounting the section for rotation about its longitudinal axis and with its aperture engaging and aligned with that of the resonator whereby rotation of the section causes the coupling loop to be introduced into the internal field of the cavity resonator.

7. A microwave switch comprising a supporting structure, a fixed coupling loop and a movable coupling loop mounted thereon, means for moving the movable loop into energy coupling relation with the fixed loop or out of energy coupling relation therewith at will, each of said loops having terminals whereby a circuit connected to one loop may be coupled to or uncoupled from a circuit connected to the other loop, a detector and an extremely short microwave circuit of electrically invariable length connected between the terminals of the movable loop and the detector.

WILLIAM A. EDSON.